United States Patent [19]

Shocklee et al.

[11] 4,129,048

[45] Dec. 12, 1978

[54] POWER PRESS GUARD

[75] Inventors: James L. Shocklee, St. Charles; Edward H. Tayloe, Ferguson, both of Mo.

[73] Assignee: ACF Industries, Inc., New York, N.Y.

[21] Appl. No.: 819,271

[22] Filed: Jul. 26, 1977

[51] Int. Cl.² .......................... F16P 1/02; F16P 3/10
[52] U.S. Cl. ....................................... 74/612; 192/133
[58] Field of Search .................... 192/133, 134, 135; 74/612, 613, 614, 615

[56] References Cited

U.S. PATENT DOCUMENTS

| 1,534,496 | 4/1925 | Biggar | 74/612 |
|---|---|---|---|
| 1,830,508 | 11/1931 | Freeburg | 74/612 |
| 2,407,527 | 9/1946 | Anstedt | 74/612 |
| 2,503,144 | 4/1950 | Willers | 74/612 |
| 3,587,344 | 6/1971 | Plumb | 74/612 |
| 3,798,998 | 3/1974 | Connors et al. | 74/612 |
| 3,896,683 | 7/1975 | Dopke et al. | 74/612 |
| 3,987,881 | 10/1976 | Perkins | 192/133 |

FOREIGN PATENT DOCUMENTS 514629  11/1939  United Kingdom ................ 192/133

*Primary Examiner*—Allan D. Herrmann
*Attorney, Agent, or Firm*—Henry W. Cummings

[57] ABSTRACT

In accordance with the present invention a power press or tool guard is provided. The guard includes a first generally vertical protective portion which is made of a protective material which is at least partly transparent through which the operator may view the operation of the tool or press; and a second protective portion which depends from the first protective portion and extends inwardly toward the press or tool. The second protective porton includes a plurality of arms or tynes which are pivotably mounted on the lower portion of the first protective portion. The inclination of the arms or tynes on a given side of the guard may be varied by a control member mounted on the first protective portion. In addition the length of individual tynes may be adjusted by loosening fasteners which hold the tynes in place depending from the first protective portion. The guard is pivotable between a first position allowing access to the press or tool for set up, and a second position covering the operating parts to protect the operator when the press or tool is in operation.

19 Claims, 6 Drawing Figures

POWER PRESS GUARD

BACKGROUND OF THE INVENTION

This invention relates to power press guards to prevent the hands and arms of the operator from being injured by a power press or tool.

U.S. Pat. No. 1,958,151 illustrates a power press guard having a three sided screen operable by handle 2 to pivot the screen about horizontal pivot point 7.

U.S. Pat. No. 3,698,527 discloses a plurality of feelers 10 which are movable about a horizontal pivot to vary their inward inclination relative to the work piece. If the feelers contact a contact member the press will be shut down.

In U.S. Pat. No. 3,987,881 a press guard is provided including a plurality of U-shaped arms or tynes mounted on support members. One of the support members is pivotable relative to the press to provide access in one position to the press and in another position completely enclosing the press. Means are provided whereby if the support member engages an obstacle such as the operator's hand in moving toward the closed position, the guard will not close.

Searjeant, *Power Press Guards and Devices*, Searjeant Safety Products Division, Hansford Manufacturing Corporation, 311 S. Winton Road. Rochester, N.Y. 14623, Brochure No. SSS-A(4/76) describes barrier guards made from a plurality of tynes which are adjustable on a side, and individual tynes are separately adjustable.

THE DRAWINGS

SUMMARY OF THE INVENTION

In accordance with the present invention a power press or tool guard is provided. The guard includes a first generally vertical protective portion which is made of a protective material which is at least partly transparent through which the operator may view the operation of the tool or press; and a second protective portion which depends from the first protective portion and extends inwardly toward the press or tool. The second protective portion includes a plurality of arms or tynes which are pivotably mounted on the lower portion of the first protective portion. The inclination of the arms or tynes on a given side of the guard may be varied by a control member mounted on the first protective portion. In addition the length of individual tynes may be adjusted by loosening fasteners which hold the tynes in place depending from the first protective portion. The guard is pivotable between a first position allowing access to the press or tool for set up and a second position covering the operating parts to protect the operator when the press or tool is in operation.

DESCRIPTION OF PREFERRED EMBODIMENTS

Figure 1:
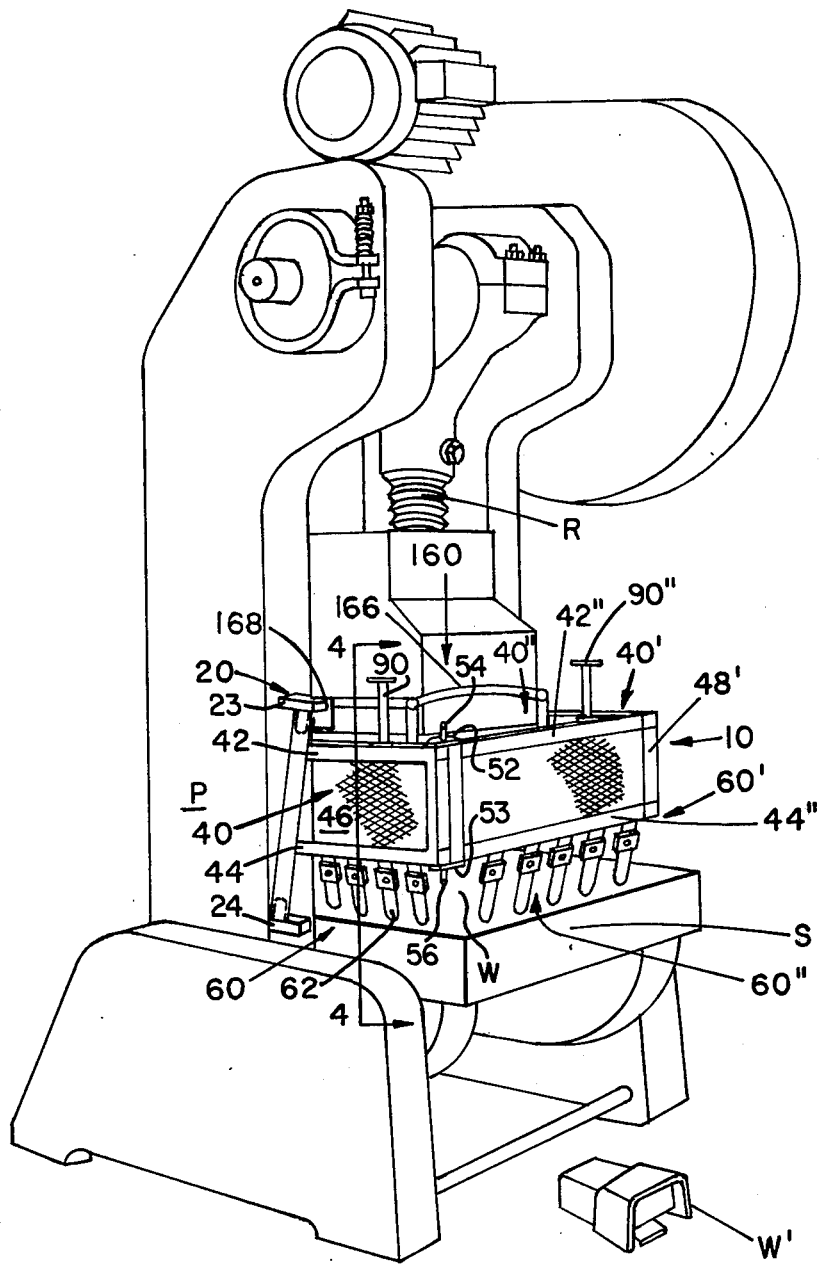
FIG. 1 is a perspective view of the power press guard of the present invention.

In FIG. 1 the power press guard 10 is shown mounted upon a power press P. Power press P includes a hydraulic ram R which is used to form a contoured shaped in the work piece W mounted on a support S. A formed piece W' is shown below the press. The operation of the press forms no part of the present invention. It is to be understood that the power press guard of the present invention may be mounted on a wide variety of presses and power tools of varying sizes to protect the operator from injuring his hands or arms while operating the press or tool.

The guard of the present invention includes hinge means 20 mounted on at least one side of the guard. Hinge means 20 pivotally mount a generally vertical first protective portion 40 including wire mesh 46 extending between horizontally extending supports 42 and 44. A second protective portion 60 depends from first protective portion 40. Protective portion 60 includes a plurality of U shaped tynes or arms 62 which are pivotally mounted about the first portion 40 and are inclined inwardly.

Figure 2:
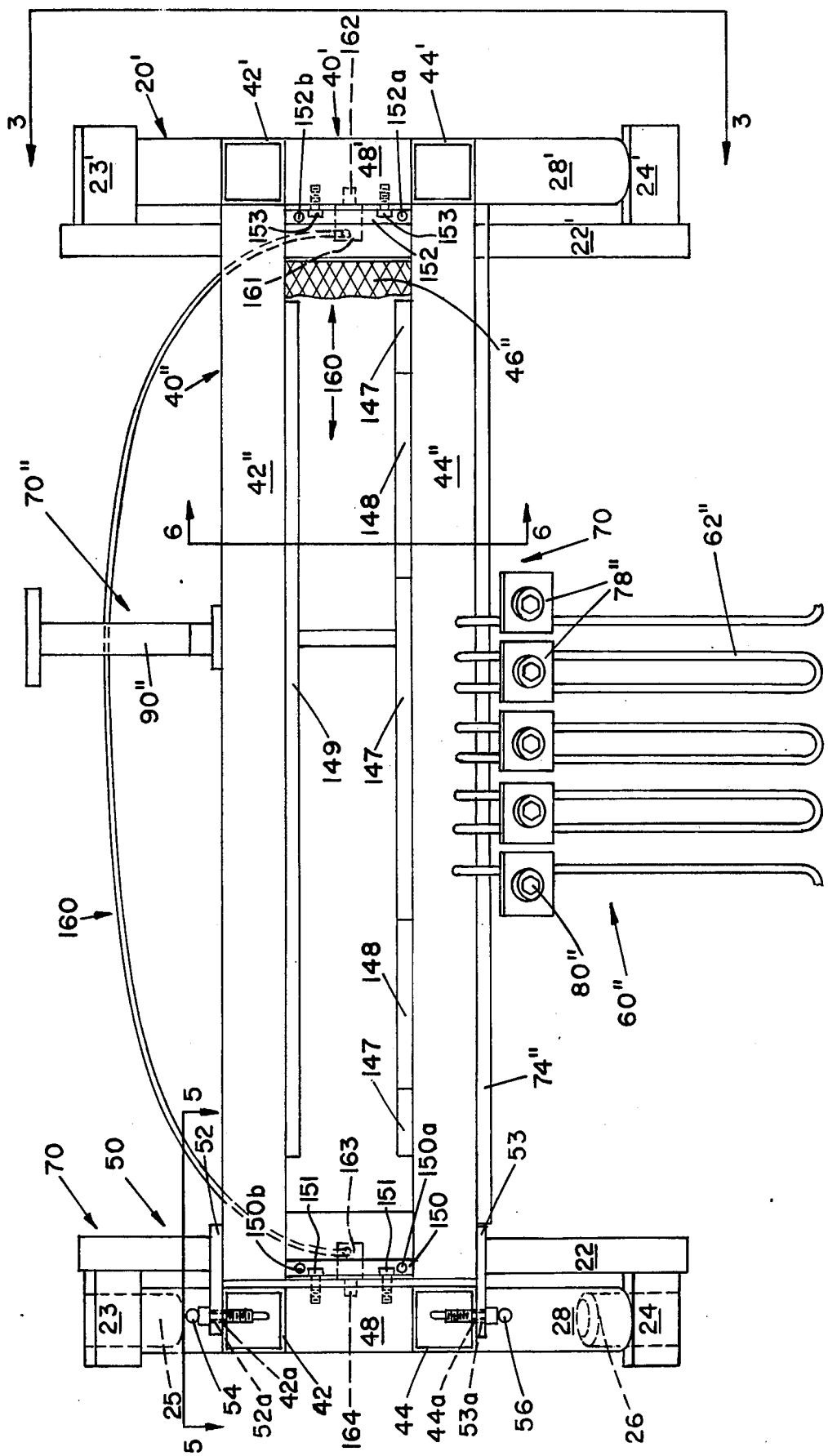
FIG. 2 is a front elevation view of the power press guard of the present invention.
Figure 3:
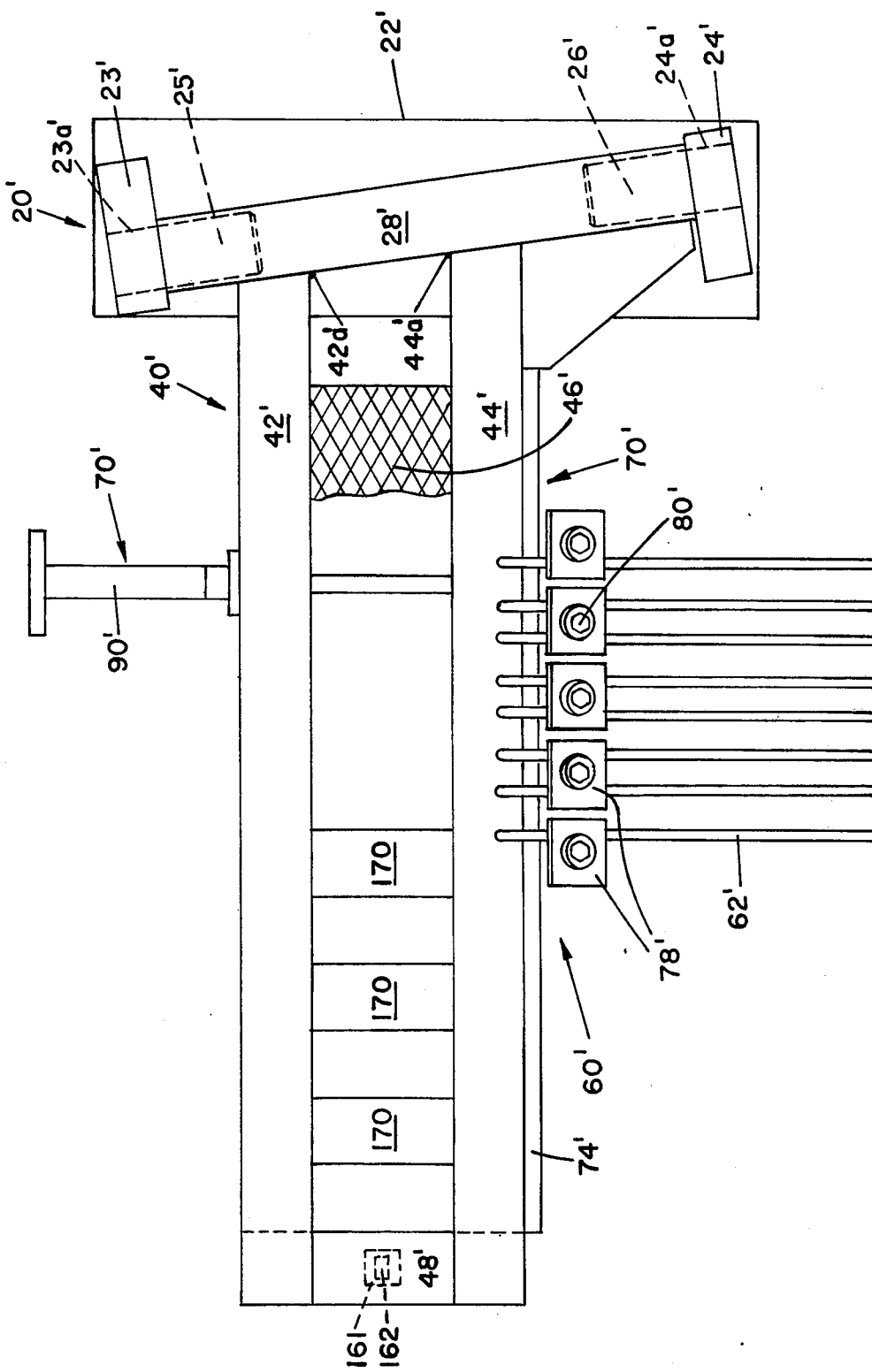
FIG. 3 is a side elevation view of one side of the power press guard looking in the direction of the arrows along the line 3—3 in FIG. 2.

As shown in FIG. 2, a second hinge means 20' is provided on the opposite side of the press guard. Both of the hinge means 20 and 20' are constructed in the same manner so only one is described and illustrated in FIG. 3. Thus hinge means 20' comprises a hinge support member 22' which is welded to the power press or power tool. Vertically spaced blocks 23' and 24' are welded to support 22'. Blocks 23' and 24' include openings 23a' and 24a ' into which are welded pins 25' and 26'. Pins 25' and 26' extend within a hollow pivot shaft 28' which is rotatable about pins 25' and 26'.

Extending outwardly from hinge means 20' is first protective portion 40'. Protective portions 40 and 40' are similar to that only one will be described in detail. Protective portion 40' includes a pair of square tube members 42' and 44' each attached to pivot shaft 28' by welding illustrated at 42a ' and 44a'. Wire mesh 46' extends between tubes 42' and 44' and is tack welded to the tubes 42' and 44'. Alternatively the wire mesh may be attached with fasteners (not shown). The wire mesh is made in a suitable size to be sufficiently transparent for the operator to view the power press operation through the mesh, and yet has sufficient strength to prevent the operator from touching the press or tool when it is operating, and sufficient strength to protect the operator from material of a certain size flying from the press or tool operation. As an example, 1 inch mesh may be used. A vertical tube 48' is welded to the distal end of tubes 42 and 44'.

The front part 40" of the first protective portion includes a pair of tubes 42". 44" each welded respectively to tubes 42' and 44'. Wire mesh 46" is again tack welded to tubes 42" and 44".

On all three sides of the press a second protective portion 60, 60' and 60" is provided including respectively a plurality of tynes 62, 62' and 62" depending respectively from first guard portions 40, 40' and 40" and inclined inwardly toward the press or tool as illustrated in FIG. 1. As shown in FIG. 1, the tynes 62, 62' and 62" are generally U-shaped members. The operator is able to insert work pieces to be pressed between the tynes 62, 62' and 62". However he is unable to get his fingers sufficiently close to the press to endanger them. The arms in each U-shaped tyne are preferably about 9/16 inch or smaller apart and the distance between tynes is preferably about 9/16 inch or smaller. This size prevents the operator's fingers from passing through or between the tynes.

Figure 4:
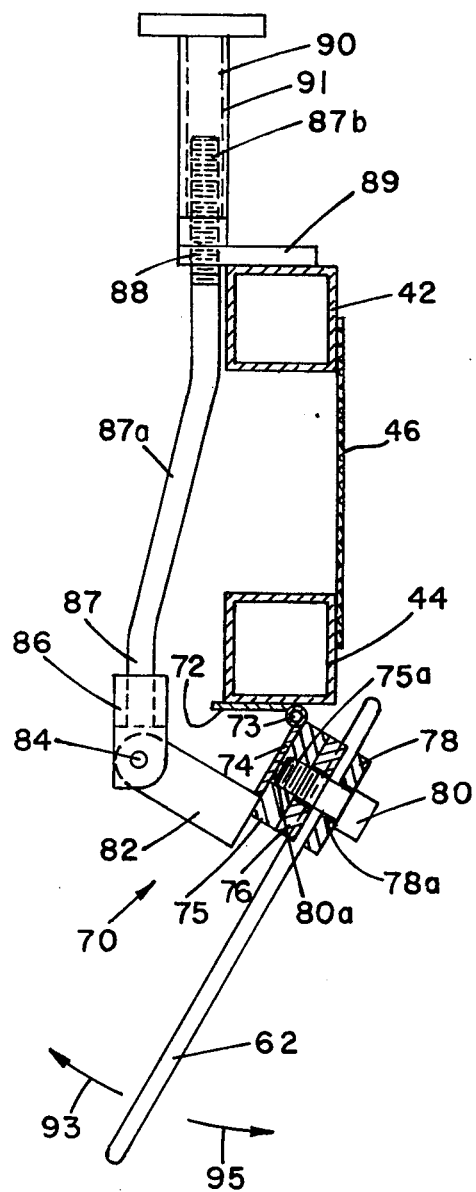
FIG. 4 is a sectional of the control member in the power press guard of the present invention looking in the direction of the arrows along the line 4—4 in FIG. 1.

The U-shaped arms or tynes 62, 62' and 62" are adjustable by means of adjusting assemblies indicated generally at 70, 70' and 70". Since these adjusting assemblies are constructed in the same manner, only one adjusting assembly 70 will be described. As shown in FIG. 4, hinge 72 is mounted upon lower tube 44. The hinge includes a hinge pin 73 and a lower plate 74 to which is attached a tyne support member 75. Tyne support 75 includes a plurality of spaced cavities 76 adapted to receive the tynes 62 which have a circular cross section. A plurality of tyne adjusting blocks 78 engage the outer surface of the tynes and a plurality of adjusting screws 80 are provided which pass through openings 78a and 75a respectively in these members, and between the U-shaped tynes. The openings 75a are threaded to engage threads 80a on screw 80 to hold the tynes in place. To adjust the tynes 62 relative to the tube 44 and the support plate 75, adjusting screw 80 is loosened and the tynes moved upwardly or downwardly as desired, depending on the contour of the press and the particular work piece.

To vary the inclination of the tynes, a connecting arm 82 is pivotally mounted by means of a pin 84 which extends through bifurcated bracket 86. The connecting arm 82 is welded to the lower portion of tyne support plate 75. Bracket 86 is attached to a rod 87 which extends upwardly including an inclined portion 87a through an opening 88 in an upper bracket 89, mounted upon the upper tube 42. Rod 87 is threaded at i s end portion 87b. A handle 90 having internal threads 91 engages the threaded end portion 87b of rod 87. Since handle 90 is threaded, and bracket 86 prevents rod 87 from rotating, rotation of handle 90 moves the rod 87 upwardly or downwardly relative to plate 89 and tube 42. Movement of rod 87 upwardly causes clockwise rotation of tynes 62 about hinge pin 73 in the direction of arrow 93, and movement of rod 87 downwardly causes counterclockwise movement of tynes 62 in the direction of arrow 95. Thus by rotation of handle 90 the inclination of the tynes 62 may be varied to a greater or lesser extent, and all the tynes on a given side will be so adjusted.

As mentioned above, the lengths of tynes 62 extending below tube 44 may be varied by loosening individual adjusting screws 80, 80' and 80". Thus the inclination and lengths of the tynes can be quickly and easily adjusted with the tyne adjustment assemblies 70, 70' and 70".

First guard portion 40' is rigidly connected to first guard portion 40", since rectangular tubes 42" and 40" are welded to rectangular tubes 42' and 44' respectively. Thus when guard portions 40' and 60' are pivoted about hinge means 20', guard portions 40" and 60" will likewise be pivoted.

Figure 5:
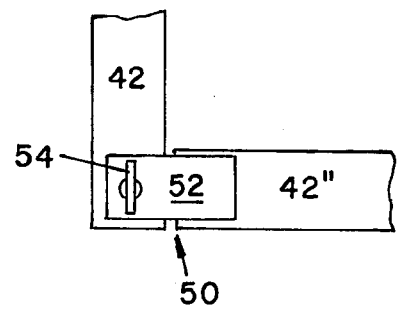
FIG. 5 is a partial plan view looking in the direction of the arrows along the line 5—5 in FIG. 2.

To connect guard portion 40 with guard portion 40", connecting means indicated generally at 50 are provided. As shown in FIGS. 2 and 5, connecting means 50 includes a plate 52 welded to tube 42" and extending outwardly therefrom. Aligned openings 52a and 42a" are drilled respectively in plate 52 and tube 42. For additional securement a plate 53 having an opening 53a may be attached to lower tube 44". The openings 52a and 42a are threaded to receive a threaded fastener 54. A similar fastener 56 may be inserted through openings 53a and 44a. Fasteners 54 and 56 are removable from plates 52 and 53 respectively to allow protective portions 40", 60" and 40', 60' to be pivoted relative to protective portions 40 and 60.

Figure 6:
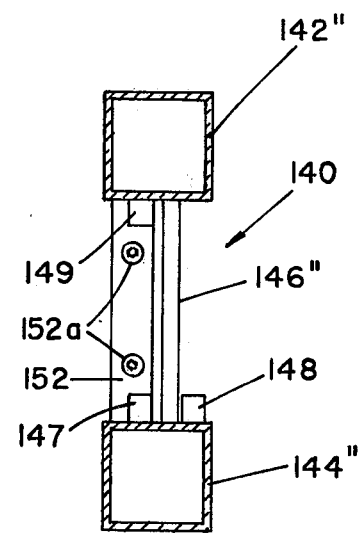
FIG. 6 is a sectional view of an alternate transparent portion looking in the direction of the arrows along the line 6—6 in FIG. 2.

For applications where it is important for the operator to carefully observe the operation of the machine and/or where the avoidance of flying matter from the work piece occurs, the embodiment illustrated in FIG. 6 may be utilized for the first protective portion. In this embodiment the first guide portion 140" includes upper and lower tubes 142", 144". A strip of transparent plexiglas 146" is provided between tubes 142" and 144". Keepers 147, 148 and 149 are provided to hold the plexiglas in place. The keepers are welded respectively to tubes 142" and 144". In addition, angles 150 and 152 are provided at opposite ends. These angles are attached with fasteners 151 and 153 to vertical tubes 48 and 48'. Angles 150 and 152 include openings 150a, 152a into which screws 150b, 152b are inserted after the plexiglas is placed within keepers 147, 148 and 149. The screws 150b maintain the plexiglas in engagement with the angles 150 and 152. The screws may be removed and the plexiglas slid out.

Furthermore, if desired for additional safety, power control means 160 may be provided to prevent the electric power for the machine being turned on unless the guard is in the closed position. The power control means 160 may comprise a pair of protective limit switches 161 and 163 each having respective limit switch contact members 162 and 164 which are part of an electrical circuit 166 (FIG. 1) going to an electrical control box 168 where the electrical power to operate the press or tool is located. Thus if guard portions 40 and 40' are not in the closed position, wherein the contact members 162 and 164 are depressed, the machine will not operate. Switches of this type are known in the art and their use is not claimed as novel per se except in combination with the power press guard assembly of the present invention.

Furthermore for some applications a series of vertical bars 170 (FIG. 3) may take the place of wire mesh 46 and 46' or plexiglas 146". The vertical bars should only be used in areas where observing the operations of the press or tool is not critical, because the areas behind the bars are blind areas which cannot be observed by the operator from outside of the guard.

OPERATION

It will be assumed that the guard assembly is in closed position and the operator has just completed a pressing operation with the power press P and it is desired to switch the machine to press a different size and shape part.

The operator first removes fasteners 54 and 56 from plates 52 and 53 and tubes 42 and 44. This enables the operator to swing guard portions 40" and 60", and 40' and 60' away from the press. These sections pivot about the pivot shaft 28'. Furthermore guard portions 40 and 60 are moved away from the remaining side of the press by pivoting portion 40 about hinge means 20 (FIG. 1) The operator can then make a different set up of the power press to make a series of parts of a different size and contour than previously made.

After the set up operation has been completed the operator pivots guard portions 40 and 60 about hinge 20, and portions 40', 60' and 40", 60" about the hinge 20. During the end of the pivoting operation plates 52 and 53 assume the position shown in FIG. 2 respectively above and below tubes 42 and 44. If protective limit switches 161 and 163 are utilized, when the portions 40 and 40' assume the closed position, the contact elements 162 and 164 will be depressed by vertical tubes 48 and 48' which will permit the current to operate and the press to be turned on. Fasteners 54 and 56 are then inserted into openings 52a, 42a and 53a, 44a to hold the assembly in the closed position.

For the new set up arrangement it may be necessary to vary the angle of inclination of the tynes 62, 62' and/or 62". This may be done by the respective control means 70, 70' and 70". As an example, in the operation of control means 70, rotation of handle 90 which causes appropriate vertical movement of rod 87 to cause either clockwise or counterclockwise pivotal movement of the tynes about the hinge 73. Furthermore it may be necessary to increase or decrease the length of individual tynes 62, 62' and 62" below the respective first protective portions 40, 40' and 40". This can be done by unloosening fasteners 80, 80' and 80" and moving the tynes up or down as desired. These adjustments may be made before or after the guard is moved into the closed position. The operator will be able to observe the press operation through the open spaces in wire mesh 46". For operations requiring more careful observation, or where flying matter from the work piece occurs, it is preferred to utilize the plexiglas 146" in the front or side of the machine instead of wire mesh or vertical bars 170.

The operator is able to insert work pieces to be pressed between the tynes 62, 62' and 62". However he is unable to get his fingers sufficiently close to the press to endanger them.

It therefore is seen that the operator's hands and fingers are carefully protected with the power press and tool guard assembly of the present invention.

The size of the first protective portions 40, 40' and 40" and the length of the tynes in second protective portions 60, 60' and 60" may vary to suit the size of the press or tool and the size of the work pieces to be processed.

What is claimed is:
1. A power press or tool guard comprising:
 a generally vertical protective portion made of a material which is at least partly transparent through which the operator may view the operation of the tool or press;
 a second protective portion depending from said first protective portion and extending inwardly toward the press or tool;
 said second protective portion including a plurality of arms or tynes which are pivotably mounted on the lower portion of the first protective portion;
 first hinge means mounting said first and second protective portions on one side of said tool or guard;
 second hinge means pivotably mounting said first and second protective portions about the front of said press or tool;
 said first and second protective portions being pivotable by means of said first and second hinge means between a first position allowing access to the press or tool and a second position covering the exposed operating parts of the press or tool; control means mounted on said first protective portion for varying the inclination of the arms or tynes on a given side of the guard; and fastening means for adjusting the length of individual tynes on a given side of the guard.

2. A guard according to claim 1 wherein said second hinge means also mounts a first and second protective portion along a second side of the press or tool.

3. A power press or tool guard according to claim 2 wherein said guard is pivotally mounted about said press on opposite sides thereof, and wherein the first and second protective portion for the front of the guard are integral with the first and second protective portions on said side.

4. A power press or tool guard according to claim 3 wherein said side protective portions and said front protective portions make an angle of at least about 90°.

5. A guard according to claim 1 wherein fastening means hold the tynes in place depending from the first protective portion.

6. A power press or tool guard according to claim 5 wherein said control means includes a hinge pivotally mounted about the lower portion of said first protective portion and wherein said tynes are mounted upon said hinge and wherein a vertically movable control rod is mounted on said first protective portion to pivot said tynes about said hinge.

7. A power press or tool guard according to claim 6 wherein said control rod is threaded and is held in place by a threaded member and wherein rotation of said threaded member causes said control rod to move vertically to pivot said tynes about said hinge.

8. A guard according to claim 1 wherein said material is made from a material selected from wire mesh and transparent glass.

9. A power press or tool guard according to claim 8 wherein said transparent material is plexiglas and keepers are provided to maintain said plexiglass in place within said first protective portion.

10. A power press or tool guard according to claim 8 wherein upper and lower metal tubes are provided and the transparent material is supported by said tubes.

11. A power press or tool guard according to claim 10 wherein said transparent material is wire mesh and wherein said wire mesh is welded to said metal tubes.

12. A power press or tool guard according to claim 11 wherein vertical rods extend between said tubes in selected areas of the guard.

13. A power press or tool guard according to claim 1 wherein the power control means are provided wherein the power to operate the machine will not turn on unless the first and second protective portions on at least one side of the press is in protective positions.

14. A power press or tool guard according to claim 13 wherein said power control means comprise limit switches.

15. A power press or tool guard according to claim 14 wherein limit switches are provided on opposite sides of said press and whereby the power cannot be turned on unless the first and second protective portions on at least two sides of the tool or press are in protective position.

16. A power press or tool guard according to claim 1 wherein connecting means are provided for connecting adjacent first protective portions.

17. A power press or tool guard according to claim 16 wherein said connecting means comprise a plate mounted on one of said first protective portions overlies part of the adjacent first protective portion and at least one fastener is removably inserted into the plate and the adjacent first protective portion to maintain the guard in closed position during operation of the press or guard.

18. A power press or tool guard comprising:
   a generally vertical protective portion made of a material which is at least partly transparent through which the operator may view the operation of the tool or press;
   a second protective portion depending from said first protective portion and extending inwardly toward the press or tool;
   said second protective portion including a plurality of arms or tynes which are pivotably mounted on the lower portion of the first protective portion;
   first hinge means mounting said first and second portective portions on one side of said tool or guard;
   second hinge means pivotably mounting said first and second protective portions about the front of said press or tool;
   said first and second protective portions being pivotable by means of said first and second hinge means between a first position allowing access to the press or tool and a second position covering the exposed operating parts of the press or tool; control means mounted on said first protective portion for varying the inclination of the arms or tynes on a given side of the guard; said control means including a hinge pivotally mounted about the lower portion of said first protective portion and said tynes are mounted upon said hinge and wherein a vertically movable control rod is mounted on said first protective portion to pivot said tynes about said hinge, and said control rod is threaded and is held in place by a threaded member and wherein rotation of said threaded member causes said control rod to move vertically to pivot said tynes about said hinge;
   and fastening means for adjusting the length of individual tynes on a given side of the guard.

19. A power press or tool guard according to claim 18 wherein power control means are provided wherein the power to operate the machine will not turn on unless the first and second protective portions on at least one side of the press is in protective position.

* * * * *